United States Patent [19]

Price

[11] Patent Number: 4,722,072
[45] Date of Patent: Jan. 26, 1988

[54] PRIORITY RESOLUTION IN BUS ORIENTATED COMPUTER SYSTEMS

[75] Inventor: Simon M. Price, Haywards Heath, England

[73] Assignee: National Research Development Corporation, London, England

[21] Appl. No.: 620,328

[22] Filed: Jun. 12, 1984

[30] Foreign Application Priority Data

Jun. 16, 1983 [GB] United Kingdom ............... 16463

[51] Int. Cl.[4] ............................................. G06F 13/36
[52] U.S. Cl. .................................. 364/900; 364/200
[58] Field of Search ... 364/200 MS File, 900 MS File; 340/825.5

[56] References Cited

U.S. PATENT DOCUMENTS

| | | | |
|---|---|---|---|
| 3,914,747 | 10/1975 | Barnes et al. | 364/200 |
| 4,375,639 | 3/1983 | Johnson, Jr. | 340/825.5 |
| 4,418,386 | 11/1983 | Vrielink | 364/200 |
| 4,644,464 | 2/1987 | Logsdon et al. | 364/200 |

FOREIGN PATENT DOCUMENTS

| | | |
|---|---|---|
| 0030095 | 6/1981 | European Pat. Off. |
| 0078389 | 5/1983 | European Pat. Off. |
| 1365838 | 9/1974 | United Kingdom |
| 2015217 | 9/1979 | United Kingdom |
| 2060960 | 5/1981 | United Kingdom |
| 2074764 | 11/1981 | United Kingdom |
| 2076190 | 11/1981 | United Kingdom |
| 2114333 | 8/1983 | United Kingdom |

OTHER PUBLICATIONS

Gibson et al., "Microcomputers for Engineers and Scientists", 1980 p. 47.

*Primary Examiner*—Gareth D. Shaw
*Assistant Examiner*—Christina M. Eakman
*Attorney, Agent, or Firm*—Cushman, Darby & Cushman

[57] ABSTRACT

A priority resolution device for bus orientated computer systems. The system includes a plurality of subsystems, each connected to an associated logic circuit, as well as structure for periodically assigning to each of the subsystems together with input to the logic circuit associated therewith a priority indicating an n-bit digital signal. Sets of n signal lines are provided, one set connected to each logic circuit to carry a corresponding bit of the n-bit signal, ranging from the most significant bit (MSB) to the least significant bit (LSB). An open collector bus has n bus lines, each connected to a corresponding one of the signal lines. Each logic circuit includes comparator means for cyclically comparing the bit value on the signal lines connected to the circuit with the corresponding current bus value to produce an output signal to enable or disenable the next least significant bit comparison by the circuit, whereby the logic circuit having the last enabled line at the end of each cycle of operation enables a requested connection of its associated subsystem.

6 Claims, 3 Drawing Figures

PRIORITY RESOLUTION IN BUS ORIENTATED COMPUTER SYSTEMS

BACKGROUND OF THE INVENTION

Field of the Invention

The present invention relates to priority resolution in bus-orientated digital computer systems and is particularly though not exclusively concerned with the high speed switching of processors, each having assigned priority, to connect the highest priority processor to a line, a device or store.

DESCRIPTION OF THE BACKGROUND

In a known computer, each one of a set of peripheral devices eg: disc drive, magnetic tape drive, paper tape reader, is connected by an associated input line to a priority logic circuit. The devices are operated on a fixed priority basis. Requests to connect to main memory from, for example, a disc drive which is connected to the highest priority input line will be granted and will inhibit, via a set of AND gates in the logic circuit, all requests on the other, lower priority, lines.

The need for priority resolution occurs in the current designs of computer-generated image systems. Priorities are assigned to surfaces, objects or light points for display in a scene. The assigned priorities determine the overlay, or occlusion, of one feature by another and are defined in terms of the distance of the feature from an observer.

A known method of priority resolution includes an off-line process to determine relative priorities of surfaces. The relative priorities are stored in a database and are used by a priority processor to generate a list of priority values held as 8-bit words. A colour transition list is calculated for each line and the transition list is modified by a priority resolver in accordance with the priority list. Priority resolution is thus performed by two on-line processes and is software intensive.

A further known process uses an off-line process to generate a tree structure for linking relative priorities of objects. An absolute priority list is generated from data held in a database and a program determines intersection points on a scan line in accordance with the absolute priority list.

In another known priority resolution system, the priorities of display features are calculated and sorted. A pixel image is written into a frame buffer in a display section of the system, starting with the lowest priority features. Subsequently high priority features overwrite lower priority features thus achieving occlusion.

An object of this invention is to provide a high speed priority-resolving bus orientated, digital computer system for connecting processors, peripherals or other circuits to a shared resource in accordance with a priority value currently assigned to or associated with, the processor, peripheral or other circuit. The processor, peripheral or other circuit may be assigned different priority values in time sequence, thus the priority associated with a particular processor, for example may change frequently while the system is running. The priority value may change at high frequency and is typically once per 25 nS in computer generated image applications of the invention.

SUMMARY OF THE INVENTION

The present invention comprises a digital computer system for resolving priority between N subsystems which require access to a shared resource, each subsystem having an n-bit priority code ascribed to it, the system comprising N logic circuits, each logic circuit corresponding to a different one of the N subsystems and each having n stages, and an open-collector bus of n lines, wherein the priority code of each of the N subsystems is connected to the open-collector bus via its corresponding logic circuit and the logic circuits operate such that the first stage of each of the N logic circuits applies the most significant bit of its subsystem's priority codes to the first line of the open-collector bus and compares the priority code bit value with the bus value and, according to a pre-determined criterion, either inhibits or enables the second stage of each logic circuit to apply the next most-significant bit of the priority codes to the second bus line for comparison whereby further enable or inhibit instructions ripple through to the least-significant-bit of each of the N subsystems' priority codes and to the final stage of each of the N logic circuits so that the subsystem whose priority code is applied to the bus via the one logic circuit whose final stage is enabled, gains access to the shared resource.

The subsystems may, for example, comprise processors, peripheral devices or memory stores or combinations thereof.

Each open-collector bus line remains HI while all the lines connected to the line are HI, but if one or more of the lines is LO the bus line state drops to LO.

Complete priority comparison takes n clocked units of time but if pipelined operation is used comparison results may be obtained for every clocked unit of time. Each resolved comparison relates to the state of requests n clocked units of time previously.

The algorithm used for priority resolution is an iterative bit-wise comparison of priority values.

BRIEF DESCRIPTION OF THE DRAWINGS

The above priorization process is carried out in the embodiments described below, with reference to the drawings of which.

DETAILED DESCRIPTION OF THE EMBODIMENTS

The embodiments employ a one-dimensional systolic array which drives a one-collector bus. Each element of the array performs a comparison between the currently ascribed n-bit priority word fed to that element and the current open-collector bus value. Each of the n bits of each word for each element is compared with the corresponding bit on the bus starting with the MSB, and the results of each comparison are fed to the next most significant bit level in the form of an 'enable' or 'disenable' signal.

Figure 1:
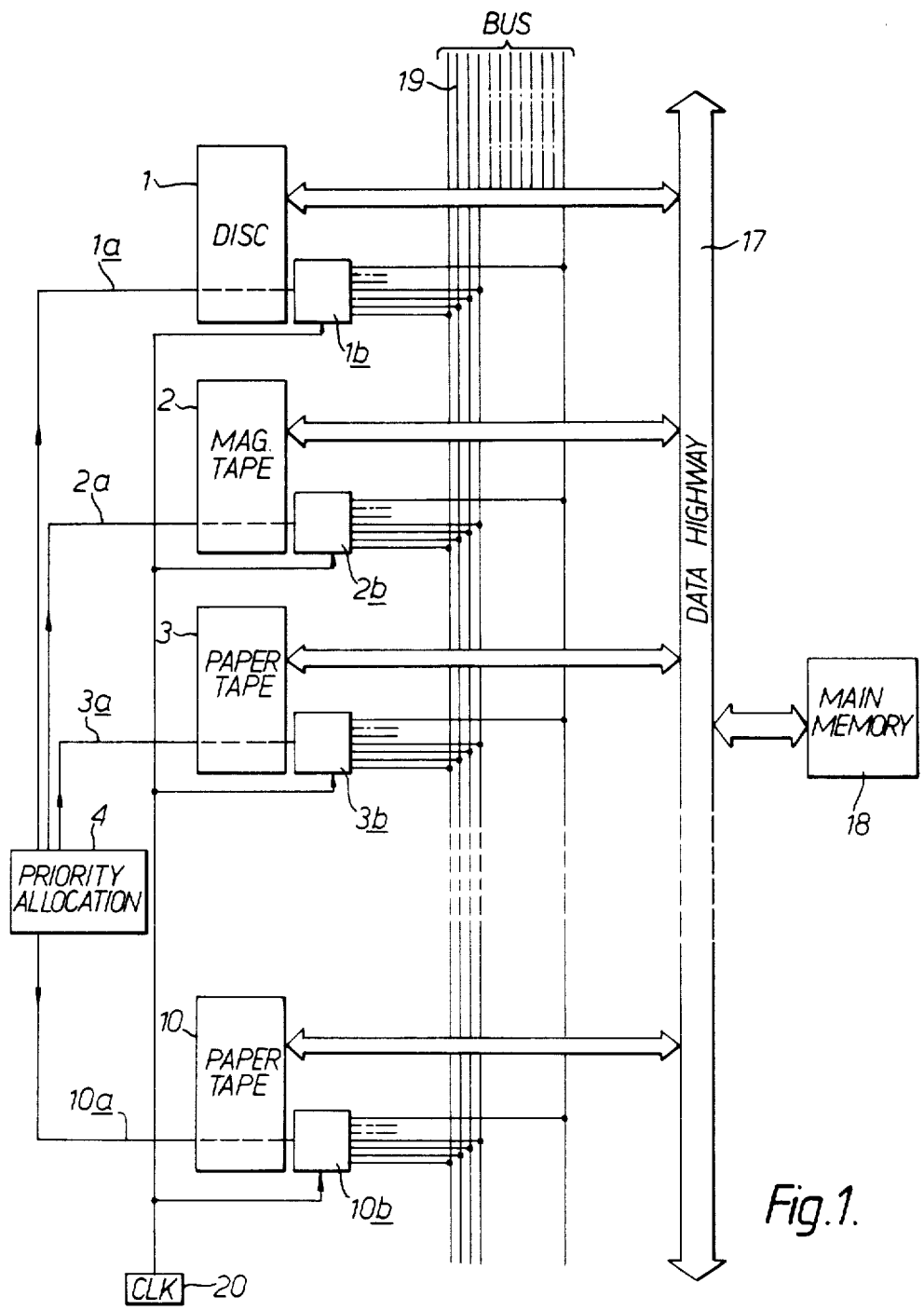
FIG. 1 shows part of a computer system having sixteen peripheral devices, of which only four are shown.

The embodiment of FIG. 1 includes a clock 20 for generating periodic signals for synchronising the operations of a computer, and 64 peripheral devices of which a disc drive 1, a magnetic tape drive 2, and two paper tape drives 3, 10 are shown. Each of the peripherals 1, 2, 3 . . . 10 has a priority value comprising a 16-bit word periodically assigned to it by a priority allocation circuit 4 via input lines 1a, 2a, 3a . . . 10a. The priority allocation circuit operates in known manner and will not be described further. The system operates such that the peripheral having the highest assigned priority value is connected via a data highway 17 to computer main memory 18. A particular one of the peripherals may be connected to the memory 18 for one or more clock periods but only whilst it has the highest assigned priority value, the other 63 peripherals remaining disconnected. Each of the ten peripherals has an associated priority logic circuit 1b, 2b, . . . 10b, each connected to an open collector, sixteen line, bus 19 for priority resolution.

Figure 2:
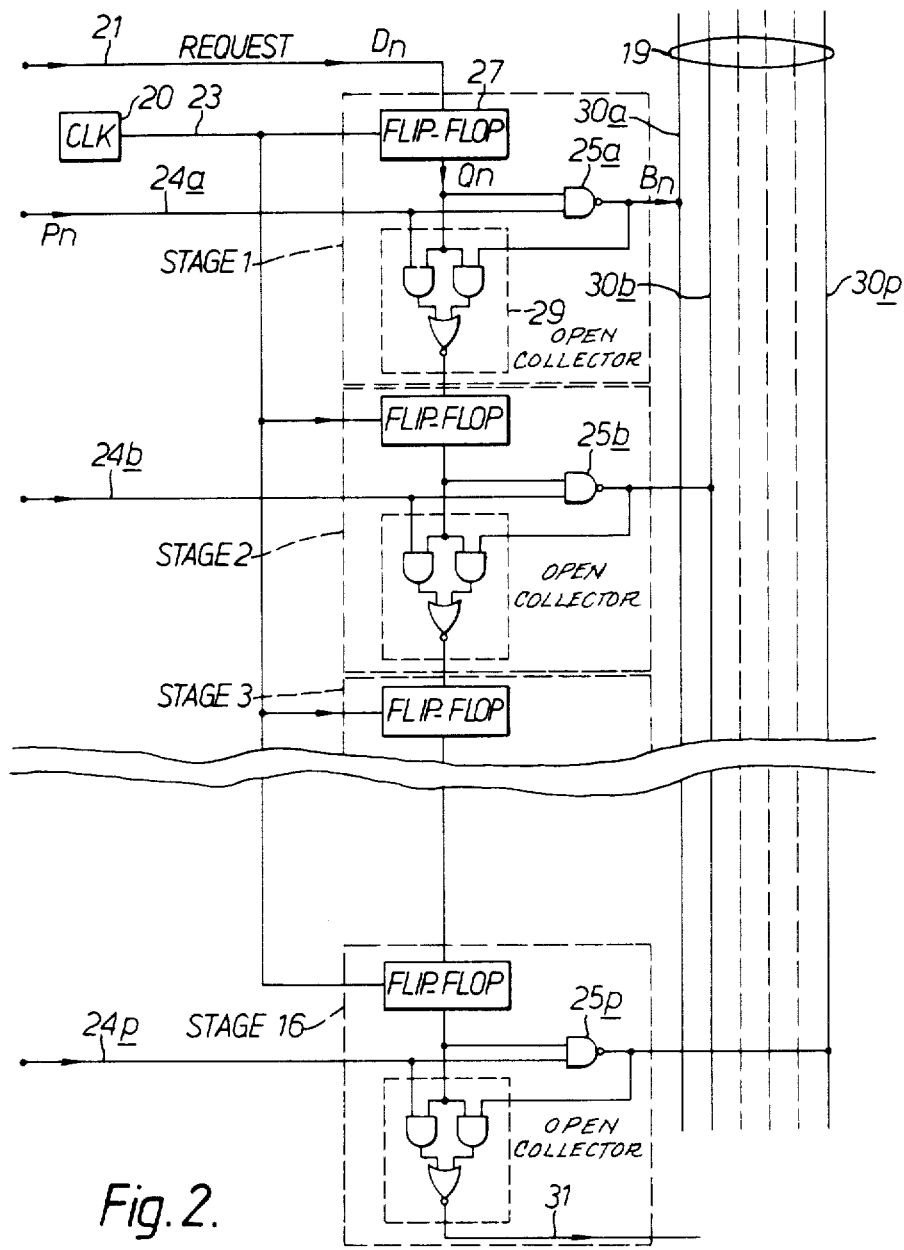
FIG. 2 shows part of the embodiment of FIG. 1 in greater detail.

FIG. 2 shows in detail the priority logic circuit 1b of FIG. 1 and connections to the open-collector bus 19.

A set of sixteen lines, of which only three lines 24a, 24b to 24p are shown, receive the assigned 16-bit priority value of the disc drive, via a latch (not shown), the line 24a being the highest priority bit line and line 24p being the lowest. The lines 24 are connected via open collector NAND gates 25a, 25b and 25p to lines 30a, 30b to 30p, respectively, of the open collector bus 19. Thus, line 30a of the bus is connected to the highest priority bit line 24a and also to corresponding highest priority bit lines in the 63 other logic circuits of FIG. 1. Initially in the absence of any request signal, the state of all the sixteen bus lines 30a-30p is HI, and the priority signals are held off the bus lines by control inputs to the NAND gates 25. When communication between the disc drive 1 and main memory 18 is required, a signal is applied to line 21 connected to a flip-flop 27 (type 74F534D) in advance of a rising edge of a signal from a clock 20 on a line 23. The rising edge of the clock signal latches the request signal into the flip-flop 27 which has an output to the NAND gate 25a and which thereby enables the priority signal on line 24a to the bus line 30a. A comparison is made between the (incoming) priority signal on line 24a and the signal on bus line 30a within by an AND-OR-INVERT gate 29, (74S51 type). The flip-flop 27, the NAND gate 25a, and the AND-OR-INVERT gate 29 form a first stage of a sixteen stage pipeline of which stages 1, 2 and 16 and part of stage 3 are shown. The stages are identical.

The logic employed in each of the stages 1, 2 . . . 16 is shown for several possible cases by the following.

TABLE 1

| Case | Pn | Bn | Qn | Output of circuit 29 | Condition |
|------|----|----|----|----------------------|-----------|
| 1 | X | X | 0 | 1 | Stage disenabled |
| 2 | 0 | 0 | 1 | 1 | Bn pulled LO |
| 3 | 0 | 1 | 1 | 0 | Pn = LO priority |
| 4 | 1 | 0 | 1 | 0 | Pn = HI Priority |
| 5 | 1 | 1 | X | X | Illegal state |

In Table 1 the signals Pn, Bn, Qn and circuit 29 output are those shown in FIG. 2. "1" and "0" represent logic levels, and "X" the "don't care" state.

In case 1, Qn is LO which indicates no request from any associated device. This disenables Pn from line 30a and disenables comparison, causing the output of circuits 29 to be HI, thus disenabling stage 2 on the next rising clock edge. In this way the lack of request ripples down the stages, one stage per clock cycle.

In case 2, Qn is Hal, which indicates a request, and Pn is a LO priority bit and would drive line 30a HI. However, another peripheral has already pulled the bus line LO (Bn=0) causing the Pn v Bn comparison to fail and generate a Hd output from circuit 29. This inhibits the next stage at the arrival of the next rising clock edge.

In case 3, although Pn is a LO priority bit, it is not overwritten on the bus and hence the output of circuit 29 is set LO thus enabling the next stage at the rising clock edge.

In case 4, Pn is a HI priority bit and thus comparison with the bus necessarily generates a LO output from circuit 29 as an enable to the next stage.

Case 5 is a condition that cannot occur since Bn must be pulled LO if Pn is HI.

The result of comparison for each bit ripples through the stages until, if found to be the highest contesting priority on the bus, a grant line 31 from the sixteenth stage goes LO, 16 clock cycles after the request on line 1. This granted request enables, for example, the disc drive 1 to communicate with the memory 18, while the other peripherals, other than disc drive 1, will have been disabled.

Figure 3:
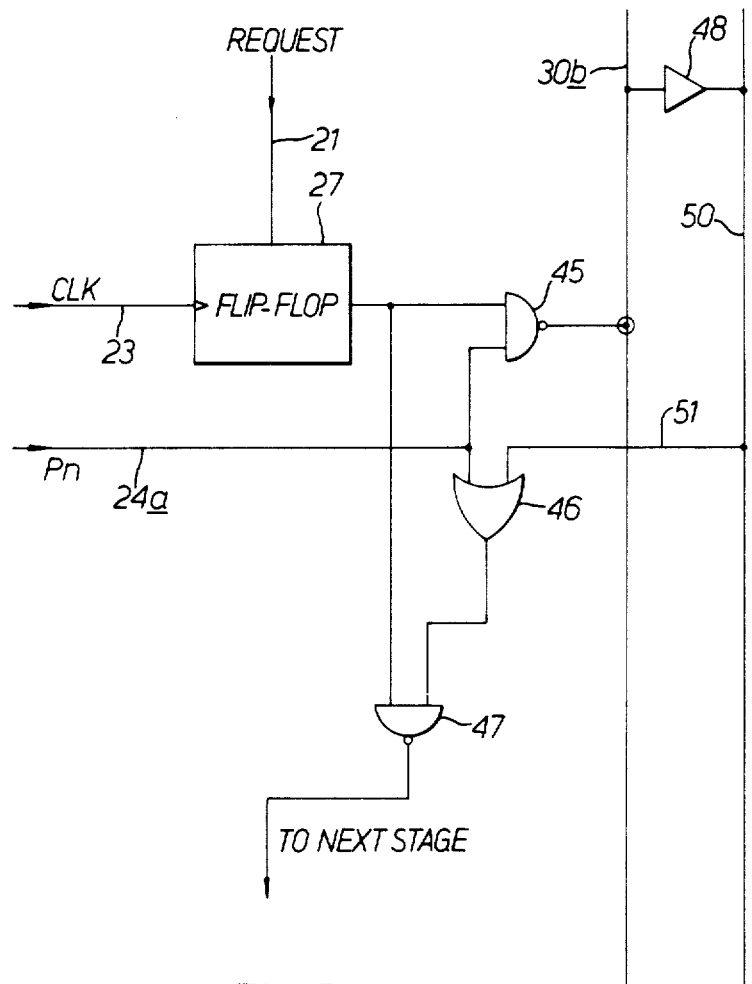
FIG. 3 shows a modification of the circuit of FIGS. 1 and 2 which reduces bus loading.

When many circuits are connected to a common bus for priority resolution using a circuit generally as shown in FIG. 2 the bus may become overloaded. The loading on the open-collector bus 19 may be reduced by buffering the sense input lines as is shown in FIG. 3 in which parts common to the embodiment of FIG. 2 have the same reference numerals. On an open collector bus line 30b a single buffer 48 senses the logic state of that line and feeds all the sense inputs corresponding to the bit value. This method imposes only a single load on the open-collector bus regardless of the number of contesting priority circuits limited to the bus. Although an extra gate delay, that of the sense line driving buffer, is introduced and the maximum permissible clock rate is reduced, buffering does allow more devices to participate in prioritisation. In FIG. 3 the Pn value on line 24a is loaded once per frame period in a CGI system, and hence is static, either HI or LO during prioritisation. In operation, where the priority bit on line 24a is HI (high priority), the output of an OR gate 46 remains HI and an enable signal is permitted to ripple through to the next stage (not shown) via a NAND gate 47.

Where the priority bits on line 24a is LO and the bus value is HI the output of OR gate 46 is HI and an enable signal ripples through to the next stage. Where, in the last case, there is a new request of higher priority setting the open collector line 30b LO, this change is sensed via a buffer line 50, and the resultant signal on line 51 propagates via gates 46 and 47. Once a stage has been switched off a desirable signal propagates down the stages via flip-flop 27 and gate 47. Pixel clock rates of up to 25 MHz can be used where buffering as illustrated in FIG. 3 is used.

Whilst the particular embodiments described above relates to a computer system having priority resolution of its peripheral devices, the invention is of wider application and may be employed in say the multiprocessor circuit a a computer generated image (cgi) system. In a particular cgi system, the multi-processor circuit employs 166 processors which are allocated to colour pixels. The number of processors selected to colour pixels may vary from 1 to 166 within a time interval which is of the order of 25 nS. Each of the processors has a priority value comprising a 16 bit word periodically assigned to them, and only the processor having the highest priority value is permitted to write to colour a pixel.

I claim:

1. A digital computer system for resolving priority between a plurality N of subsystems which require access to a shared resource, the priority being determined by an n-bit priority code, where n > 1, ascribed to each subsystem, and where the n bits of each priority code each possess a different significance, the system comprising:

an open-collector bus having n lines, each said line adapted to have assume a state representing a logic value, each one of said n lines corresponding to each of said n bits of the priority code;

a plurality N of logic circuits, one of which being connected to each of the N subsystems and each of which having n stages, each said stage corresponding to a bit of a priority code and connected to a line of the open collector bus corresponding to a same bit of the priority code, the stages being connected in series with one another in a descending order of significance; and means for applying each bit of the priority code of each subsystem to a corresponding stage of an associated logic circuit of said subsystem, bits of the priority code addressing said logic circuit such that a most significant bit of the priority code is addressable to a first stage of the logic circuit and a least significant bit of the priority code is addressable to a nth stage;

wherein a first stage of each said subsystem comprises means for applying said most significant bit to a corresponding line of the open collector bus, means for comparing a value of said most significant bit with a logic value of said corresponding line and means for selectively inhibiting/enabling, according to a pre-determined criterion, the next stage of the logic circuit, to apply a next most significant bit to a corresponding line of the open-collector bus;

and wherein each stage subsequent to said first stage of each said subsystem comprises means for comparing, when enabled by said inhibiting/enabling means of a previous stage, logic values of a corresponding priority code bit and a corresponding line of the open-collector bus and means for inhibiting/enabling a next stage of the logic circuit, enable/inhibit instructions thereby rippling through each logic circuit to said nth stage, after which only one circuit is enabled, and the subsystem connected to said logic circuit gaining access to the shared resource.

2. A system as claimed in claim 1 wherein the N subsystems comprise microprocessors and the shared resource is a memory store.

3. A system as claimed in claim 1 wherein the N subsystems are processors which provide color signals to pixels of a computer-generated image apparatus.

4. A digital computer system as claimed in claim 1 further comprising:

n buffer lines, each adapted to have assume a state representing a logic value and each buffer line being buffered to a corresponding line of said open-collector bus; and means for comparing the logic value of each buffer line with the corresponding code bit value.

5. A system as claimed in claim 4 wherein the N subsystems comprise microprocessors and the shared resource is a memory store.

6. A system as claimed in claim 4 wherein the N subsystems are processors which provide color signals to pixels of a computer-generated image apparatus.

* * * * *